United States Patent Office 3,305,562
Patented Feb. 21, 1967

3,305,562
PROCESS FOR MAKING ALPHA-PYRROLIDINO-VALEROPHENONES
Wilhelm Heffe, Freiburg im Breisgau, Germany, assignor to Dr. A. Wander A.G., Bern, Switzerland, a corporation of Switzerland
No Drawing. Filed May 22, 1961, Ser. No. 111,488
Claims priority, application Switzerland, May 24, 1960, 5,920/60
2 Claims. (Cl. 260—326.5)

The object of the invention is a class of new α-pyrrolidino-valerophenones of Formula I:

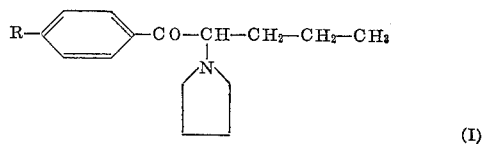

(I)

wherein R denotes hydrogen, a chlorine atom, a methyl or a methoxy group, as well as salts of these bases. Further objects of the invention are processes for preparing these compounds.

Substances of the above formula and their salts, e.g. the halides, possess a good action on the central nervous system without undesirable side effects, like stimulating effects on the circulatory system or depressing the activity of said system.

This action is very specific for the compounds according to the invention. Minor variations from the given Formula I lead, according to our observations to a weakening or to a loss of the action or to the emergence of undesirable side effects. For example, the action is wholly or partly lost in the following cases:

(a) if the substituent R is in another position than the p-position or if it appears several times in the benzene nucleus (e.g. 3,4-di-R- or 3,4,5-tri-R-compounds);
(b) if alkyl or alkoxy groups with more than one C-atom appear in the substituent R;
(c) if the keto group is reduced to the hydroxy group;
(d) if the hydrogen atom on the tertiary C-atom is replaced by an alkyl group; or
(e) if the propyl group on the tertiary C-atom is replaced by an alkyl group with less than 3 C-atoms.

The α-pyrrolidino-valerophenones (I) according to the present application can be obtained by several processes.

A preferred process consists in producing alkaline rearrangement of a quaternary ammonium compound of Formula II:

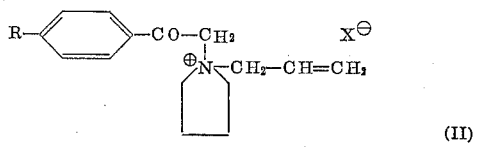

(II)

wherein X denotes an acid radical, preferably a bromine ion, and if desired, hydrogenation of the product of rearrangement to bring about saturation of the allyl group.

The rearrangement is carried out in the presence of alkalis or amines, and preferably in the presence of aqueous sodium hydroxide solution, while warming. The hydrogenation is usefully carried out catalytically with hydrogen, using e.g. palladium on carbon as the catalyst.

The quaternary ammonium compound (II) can be obtained, for example, by treating an α-bromo-acetophenone, suitably substituted in the benzene nucleus, with pyrrolidine, and by reacting the resulting α-pyrrolidino-acetophenone derivative with an allyl derivative suitable for the formation of quaternary salts, like allyl bromide, in accordance with the diagram:

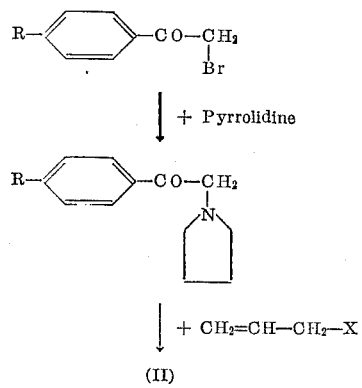

(II)

Another process, which is suitable for the manufacture of the products (I) likewise starts out from a valerophenone, substituted if desired in the nucleus, and which is halogenated, especially brominated, to the corresponding α-halogen derivative of Formula III:

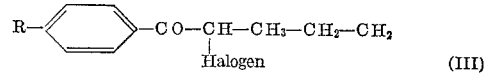

(III)

and then reacted with pyrrolidine. The α-halogen-valerophenone can also first be converted through treatment with an alkali-metal alkoxide into epoxy ether of the formula

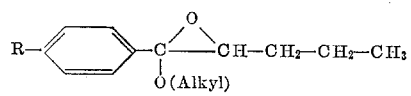

which, on reacting with pyrrolidine, yields the desired product (I).

The formation of the epoxy ether is suitably carried out in an organic solvent, such as methanol, ethanol, ether, tetrahydrofuran and the like, preferably while warming. The epoxy ether need not be isolated for its reaction with pyrrolidine, which is best carried out in a closed vessel at high temperature.

Another process for the manufacture of products according to Formula I consists in treating a corresponding hydroxy compound of Formula IV:

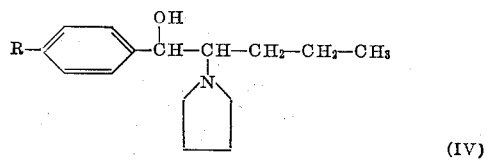

(IV)

with an appropriate oxidizing agent like chromic anhydride or an alkali-metal dichromate. The oxidation can, for example, be carried out at room temperature in an aqueous solvent containing a mineral acid, extracting the resultant ketone with an organic solvent and isolating it in the usual manner.

Another process for the manufacture of products according to Formula I consists in reacting a carboxylic acid amide of Formula V, which may be mono- or di-substituted on the nitrogen:

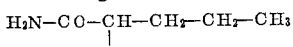

(V)

under anhydrous conditions with a p-R-phenyl-magnesium halide and in hydrolysing the resultant organometallic compound. The reaction can, for example, be carried out in anhydrous ether or tetrahydrofuran at room temperature or at high temperature.

The acid-addition salts of the bases according to Formula I are obtained in the usual manner by reacting the bases with appropriate inorganic or organic acids, such as hydrochloric acid, hydrobromic acid, sulphuric acid, phosphoric acid, acetic acid, tartaric acid, maleic acid, oxalic acid, citric acid, and the like.

The products according to the invention, of central nervous system stimulating action, can be administered in suitable pharmaceutical forms using the usual carrier, accessory and filling agents, e.g. in the form of tablets or coated tablets with approximately 5 to 60 mg. of active substance, or of suppositories with approximately 10 to 100 mg. of active substance therein, under the direction of a physician. The desired central-stimulating action is effected by a dosage of 0.1 to 1 mg. active substance per kg. body weight.

Example 1

50 gm. of α-bromo-p-methoxy-valerophenone, obtained by bromination of p-methoxy-valerophenone, are dissolved in 75 ml. of benzene and 50 ml. of pyrrolidine are added at 0° C. The whole is allowed to stand for 12 hours at room temperature and then boiled for 1 hour in the reflux condenser. After cooling, it is washed with water, dried, and acidified with hydrochloric acid. Then it is evaporated to dryness and recrystallized from methanol-acetone-ether. There are obtained 38.5 gm. of α-pyrrolidino - p - methoxy-valerophenone hydrochloride, melting point 177° C., equivalent to a yield of 70% of the theoretical.

Example 2

23.1 gm. of α-bromo-p-methyl-valerophenone, obtained by bromination of p-methyl-valerophenone, are dissolved in 50 ml. of benzene and 25 ml. of pyrrolidine are added at 0° C. The whole is boiled for 20 minutes, cooled, washed twice with water, dried and acidified with about 50 ml. of 2-n hydrochloric acid. After evaporation, it is recrystallized from methanol-acetone-ether. There are obtained 22.6 gm. of α-pyrrolidino-p-methyl-valerophenone hydrochloride, melting point 178° C., equivalent to a yield of 88.5% of the theoretical.

Example 3

44 gm. of N-p-methoxy-phenacyl-N-allyl-pyrrolidinium bromide are treated for 15 minutes on a water bath with 100 ml. of 2-n sodium hydroxide solution. A yellow oil is liberated which, after cooling, is extracted with benzene. The dried benzene solution is acidified with 2-n hydrochloric acid (65 ml.). The salt obtained by evaporation is recrystallized from methanol-acetone, which yields 35 gm. of pyrrolidino-α-allyl-p-methoxy-acetophenone hydrochloride, melting point 183° C., equivalent to a yield of 92% of the theoretical.

17.7 gm. of this substance are hydrogenated in 150 ml. of methanol at atmospheric pressure and room temperature in the presence of 0.5 gm. of palladium on carbon (5%). After 25 minutes the theoretical quantity of hydrogen is absorbed. By filtering the reaction mixture, evaporating and recrystallizing, there are obtained 16.1 gm. of α-pyrrolidino-p-methoxy-valerophenone of melting point 177° C., equivalent to a yield of 90% of the theoretical.

Example 4

47 gm. of N-p-methyl-phenacyl-N-allyl-pyrrolidinium bromide are warmed for 20 minutes with 130 ml. of 2-n sodium hydroxide solution on a water bath. Small drops of yellow oil are liberated which, after cooling, are extracted with ether. The ethereal solution, dried with sodium sulphate, is for the most part evaporated and then acidified with 2-n hydrochloric acid (about 75 ml.). Then it is evaporated and recrystallized from methanol-acetone-ether. There are obtained 36 gm. of α-allyl-α-pyrrolidino - p - methyl-acetophenone hydrochloride, melting point 196° C., equivalent to a yield of 89% of the theoretical.

14 gm. of this substance are dissolved in 100 ml. of methanol and hydrogenated at atmospheric pressure and room temperature in the presence of 0.4 gm. of palladium on carbon (5%). After 25 minutes, the theoretical quantity of hydrogen is absorbed. There are obtained 12.8 gm. of α-pyrrolidino-p-methyl-valerophenone hydrochloride, melting point 178° C., equivalent to a yield of 91% of the theoretical.

Example 5

While stirring and occasionally cooling with water, 50 gm. of n-valeroylchloride are added drop by drop at 25°–30° C. to 60 gm. of aluminium chloride in 200 ml. of chlorobenzene. After the reaction has ended, the whole is warmed for half an hour in a boiling water bath. It is decomposed with an ice-water mixture, and the chlorobenzene layer is removed after adding ether and washed free of acid with water and bicarbonate solution. After drying with sodium sulphate, the residue is distilled; boiling point: 140° C./12 mm. Hg; yield: 70.3 gm. equivalent to 86.2% of the theoretical.

10 gm. of the p-chloro-n-valerophenone, obtained in this way, in 30 ml. of chloroform are reacted with 2.6 ml. of bromine in 10 ml. of chloroform. After washing with water and drying over sodium sulphate, the solution is evaporated. The residue is dissolved in 30 ml. of benzene and, while cooling, 10.5 ml. of pyrrolidine are added. After allowing to stand for 3 hours at 20° C., it is warmed for half an hour on a boiling water bath. The lower layer is washed with a little water and dried over sodium sulphate. The residue of the benzene solution is weakly acidified with 22 ml. of 2-n hydrochloric acid and evaporated to dryness. For the purpose of decoloration the crude hydrochloride is digested with cold acetone and recrystallized from 94% acetone. There are obtained 9.4 gm. of pyrrolidino-p-chloro-n-valerophenone hydrochloride of melting point 203°–208° C. (sintering from 190° C.), equivalent to a yield of 61% of the theoretical.

Example 6

To 750 gm. of n-valerophenone in 2.5 litres of chloroform, which is placed in a 10-litre porcelain dish with a powerful stirrer, 235 ml. of bromine in 500 ml. of chloroform are added drop by drop within 35 minutes; then it is stirred for another 15 minutes. The bright yellow chloroform solution is washed free of acid with water and bicarbonate solution and dried over sodium sulphate, and the chloroform is distilled off as extensively as possible. There are obtained 1104 gm. of crude α-bromo-valerophenone of boiling point$_{22}$ 159° C., equivalent to a yield of 99% of the theoretical.

275 gm. of this compound in 700 ml. of benzene are mixed at 0° C. with 220 ml. of pyrrolidine (2.3 mol). Within a few minutes the solution becomes warm, whereupon it is cooled for a short time by placing in ice. After allowing to stand for 3 hours at room temperature, it is again boiled for 15 minutes. The cooled solution is shaken thoroughly twice with a little water, and the benzene solution is dried over sodium sulphate and the benzene is distilled off. The residue is weakly acidified with 525 ml. of 2-n hydrochloric acid and the solution is evaporated to dryness. By treating with acetone there are obtained 248 gm., and by processing the acetone mother liquor another 26 gm., of crude α-pyrrolidino-n-valerophenone monohydrate hydrochloride, equivalent to a yield of 85% of the theoretical.

α-Pyrrolidino-n-valerophenone hydrochloride and its hydrate are almost insoluble in acetone and readily soluble in water, methanol and alcohol. They can be easily recrystallized from five times the amount of acetone in the presence of approximately 1 mol of $H_2O$. There is obtained directly 91% to 94% of the crude product in pure substance, and 98% after processing the mother liquor. The resultant substance has a melting point of 104°–106° C., which, after expulsion of 6% $H_2O$, rises to 169°–170° C. (anhydrous form).

*Example 7*

19 gm. of epoxy-methyl ether, obtained by reacting α-bromo-valerophenone with sodium methoxide, together with 35 gm. of pyrrolidine are heated at 180° C. for 7 hours in an autoclave. The reaction mixture is mixed with water and extracted with benzene. The organic phase is washed three times with water, dried over sodium sulphate, acidified with 2-n hydrochloric acid, and evaporated in vacuo to dryness. On recrystallizing from acetone, there are obtained 16 gm. of α-pyrrolidino-valerophenone monohydrate hydrochloride, melting point 104° to 106° C.

*Example 8*

While stirring and cooling, a solution of 14 gm. of α-pyrrolidino-isovalerianic acid amide in 150 ml. of absolute dioxan is slowly added to a Grignard solution prepared from 17 gm. of bromobenzene in 100 ml. of absolute ether and 2.5 gm. of magnesium filings. The mixture is heated, while being stirred, for 10 hours at reflux. The product of reaction is decomposed with ice and diluted hydrochloric acid, the organic phase is extracted twice with diluted hydrochloric acid, and the combined hydrochloric extracts are made alkaline with diluted sodium hydroxide solution and extracted with benzene. The benzene solution is processed further as in Example 7, whereupon 17 gm. of the same product as in Example 7 are obtained.

*Example 9*

While stirring, a solution of 10 gm. sodium dichromate in a mixture of 50 ml. of water and 15 ml. of concentrated sulphuric acid is slowly added to 19 gm. of 1-phenyl-2-pyrrolidino-pentanol-1 dissolved in a mixture of 50 ml. of water and 6 ml. of concentrated sulphuric acid. The reaction mixture is stirred for 3 hours at room temperature. Then it is made alkaline and extracted with benzene. The benzene solution is proceesd further as in Example 7, whereupon 15 gm. of the same product as in Example 7 are obtained.

*Example 10.—Production of tablets*

110 gm. of the product obtained according to Example 1 are kneaded with 1,221 gm. of pulverized lactose, 22 gm. of paraffin oil and a solution of 22 gm. of gelatin in 130 ml. of water, and granulated through sieve 16. The granulate is dried at 40° C. and passed through sieve 12.

The tabletting is done using the following composition:

| | |
|---|---|
| Dry weight of the granulate gm | 1,357 |
| Corn starch gm | 190.0 |
| Stearin-talcum gm | 11.0 |
| Talcum gm | 78.0 |
| Magnesium stearate gm | 9.0 |
| Saccharin solub. gm | 7.7 |
| Oleum Menthae pip. drops | 44 |
| Sacchar. Lactus praep. gm | 953.3 |
| | 2,606 |

The soluble saccharin is triturated in a mortar to a fine powder and uniformly mixed with the corn starch. The peppermint oil is diluted with 10 ml. of ether, and the solution is added to the talcum and mixed until the ether has evaporated.

The granulates are mixed, the disintegrating agents, lubricants and concentrates are added after being sieved, and the whole is thoroughly mixed. The final mixture is compressed on the Henning tabletting machine into tablets of 9 mm. diameter, with cross-grooves, without pressed border, and with a weight of 0.24 mg. each.

What I claim is:

1. The process for the production of a free base selected from the group consisting of α-pyrrolidino-valerophenone and p-substituted α-pyrrolidino-valerophenones having the Formula I:

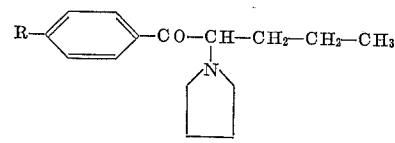

(I)

wherein R is a member selected from the class consisting of hydrogen, methyl and methoxy which comprises; heating a quaternary ammonium compound having the Formula II:

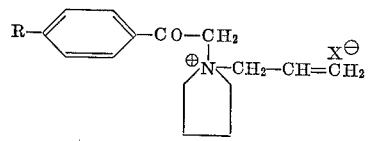

(II)

wherein X denotes an acid anion, R is as defined above, in an aqueous alkaline solution thereby effecting alkaline rearrangement and forming a product having the Formula III:

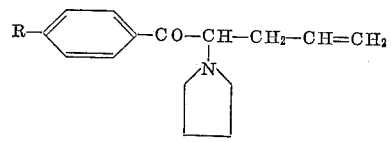

(III)

R is as defined above, thereafter contacting the said product of alkaline rearrangement with hydrogen to saturate the double bond of the terminal unsaturated alkyl radical to form a product having the Formula I.

2. The process of producing the base p-methyl-α-pyrrolidino-valerophenone which comprises; heating the compound N-p-methyl-phenacyl-N-allyl-pyrrolidinium bromide in an aqueous sodium hydroxide solution to effect alkaline rearrangement and thereby forming the product α-allyl-α-pyrrolidino-p-methyl-acetophenone, and contacting the said product with hydrogen to effect hydrogenation of the said allyl radical thereof to form the compound p-methyl-α-pyrrolidino-valerophenone.

References Cited by the Examiner

UNITED STATES PATENTS 3,000,946  9/1961  De Stevens _____ 167—55
3,001,910  9/1961  Schutte _____ 260—326.6

FOREIGN PATENTS 765,544  1/1957  Great Britain.

OTHER REFERENCES

Hanning et al.: "Pharm., Zentralhalle," vol. 96, 570–3 (1957).

ALEX MAZEL, *Primary Examiner.*

IRVING MARCUS, WALTER A. MODANCE,

*Examiners.*

JOSE TOVAR, *Assistant Examiner.*